United States Patent [19]

Armbruster

[11] Patent Number: 4,573,715
[45] Date of Patent: Mar. 4, 1986

[54] TEMPORARY DUCT LINER INTERCONNECT DEVICE

[75] Inventor: George E. Armbruster, Park Ridge, Ill.

[73] Assignee: Illinois Bell Telephone Company, Chicago, Ill.

[21] Appl. No.: 669,759

[22] Filed: Nov. 9, 1984

[51] Int. Cl.[4] ............................................. F16L 17/00
[52] U.S. Cl. ...................................... 285/94; 285/419; 285/DIG. 4; 24/517
[58] Field of Search ................... 285/94, 87, 244, 373, 285/419, DIG. 4; 24/19, 24, 270, 273, 285, 506, 516, 517, 544

[56] References Cited

U.S. PATENT DOCUMENTS

| | | | |
|---|---|---|---|
| 411,942 | 10/1889 | Teutsch | 24/19 |
| 689,541 | 12/1901 | Cunningham | 285/373 |
| 1,012,345 | 12/1911 | Ferguson | 24/19 |
| 3,007,722 | 11/1961 | Anderson et al. | 285/419 |
| 3,565,213 | 2/1971 | Heller | 185/15 |
| 3,711,632 | 1/1973 | Ghirardi | 174/135 |
| 4,168,091 | 9/1979 | Boomgarden et al. | 285/419 |
| 4,248,459 | 2/1981 | Pate et al. | 285/319 |
| 4,273,367 | 6/1981 | Keeney et al. | 285/419 |
| 4,328,983 | 5/1982 | Gibson | 285/383 |
| 4,443,031 | 4/1984 | Borsh et al. | 285/419 |

FOREIGN PATENT DOCUMENTS 117406 1/1927 Switzerland ..................... 24/270

Primary Examiner—Cornelius J. Husar
Assistant Examiner—Douglas W. Hanson
Attorney, Agent, or Firm—Emrich & Dithmar

[57] ABSTRACT

A duct liner interconnecting device for temporarily interconnecting the ends of sections of duct liner includes a pair of complementary semi-cylindrical elements hinged together along one edge for movement from an open position in which the elements are side by side to a closed position in which the elements form a short tubular member with a longitudinal channel to receive the ends of duct liner sections to be interconnected, a pair of arcuate spring clips pivotally attached to one of the elements releasably latch the elements together in the closed position, and a tapped aperture in one of the elements receives a lubrication fitting to allow the introduction of lubricant into the duct liner to facilitate pulling of lightguide cable through the duct liner.

9 Claims, 7 Drawing Figures

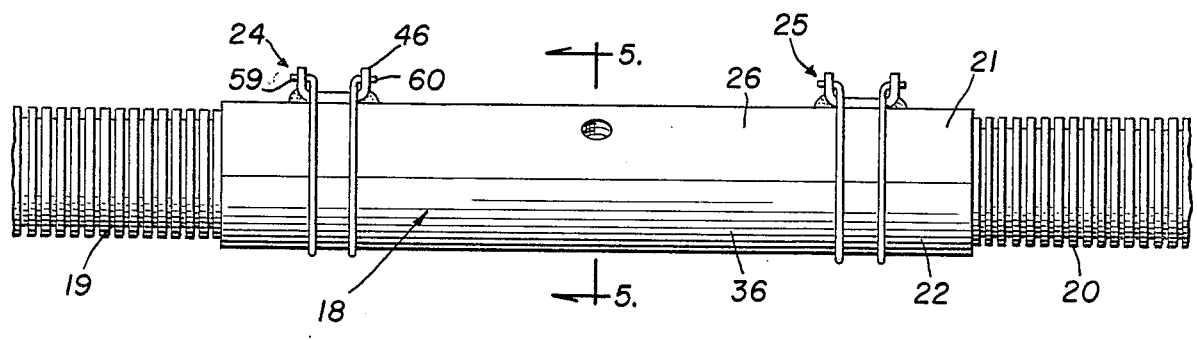
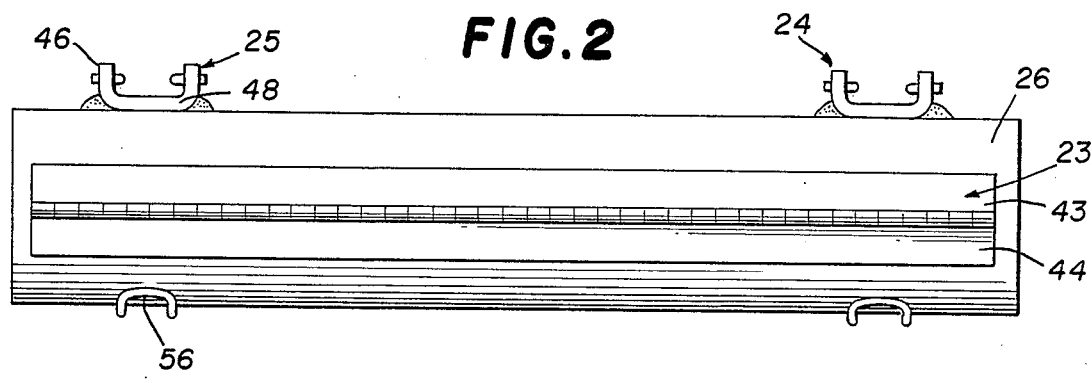
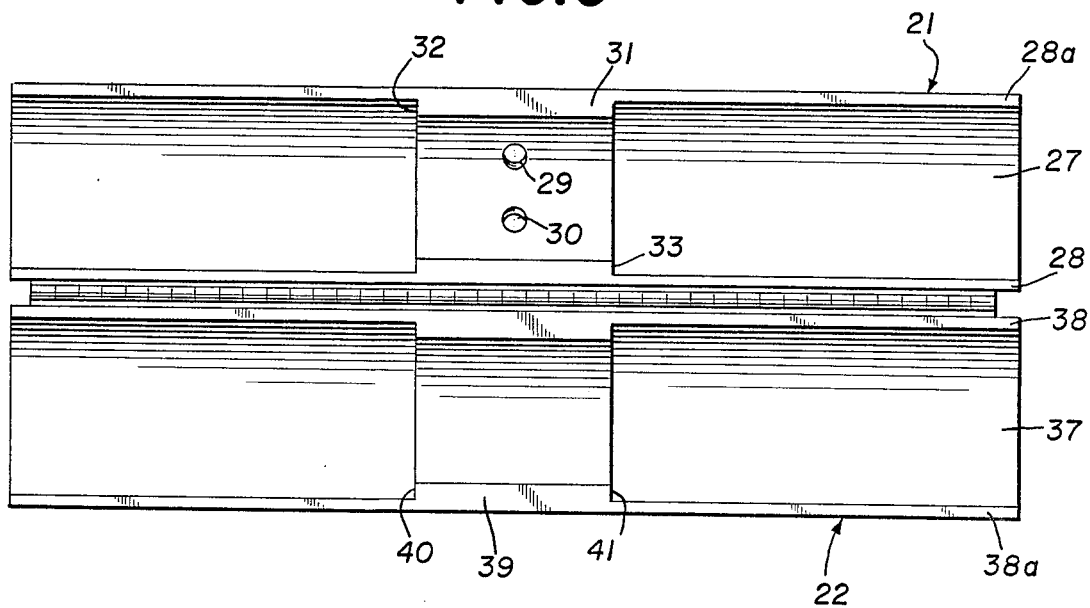

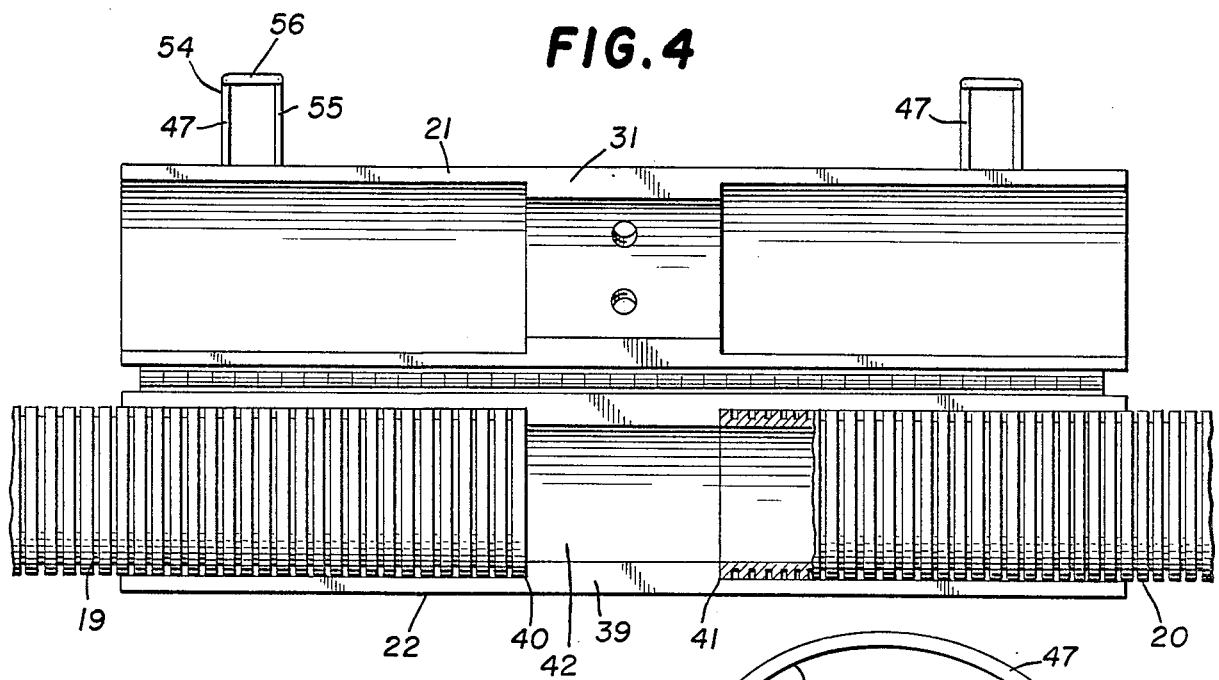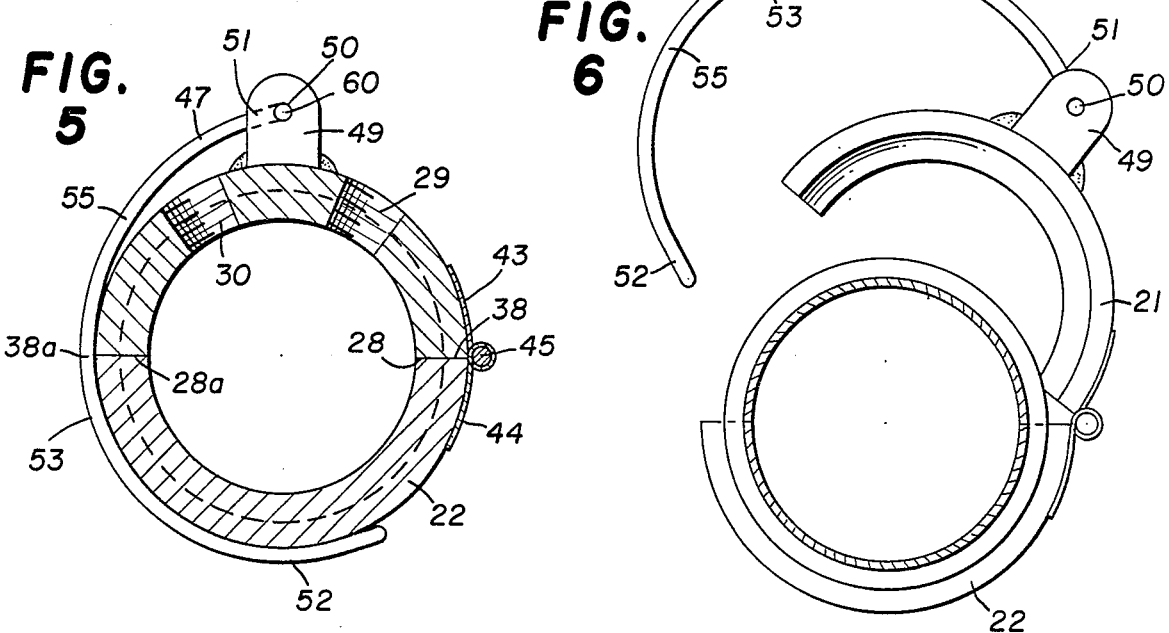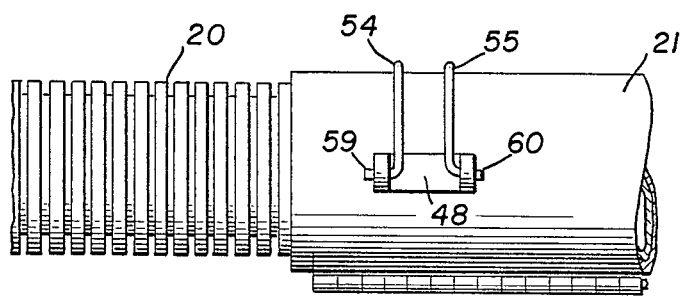

TEMPORARY DUCT LINER INTERCONNECT DEVICE

BACKGROUND OF THE INVENTION

This invention relates to connecting duct liner in a conduit system, and more particularly to a duct liner interconnect device for temporarily interconnecting the ends of two sections of flexible duct liner and for enabling automatic application of lubricant to lightguide cables, wire cables, or the like while they are being pulled into and through the conduit.

It is common practice to run lightguide cables through wiring ducts provided with duct liners located underground. The duct liner is usually installed in sections, typically 800 feet long, and a coupling device is installed at the junction of adjacent duct liner sections to both interconnect the sections and provide a permanent covering for the discontinuity in the duct liner.

In the past, it has been customary to have a man at the intermediate point of the cabling into the duct liner who lubricates the cable as he inserts it into the duct liner so that as the cable is pulled through the duct liner it will not be subjected to damage to its insulation or to stretch damage or possible rupture. In practice, the hands of the men inserting and greasing the cable become greased and slippery and this can set a practical limit on the length of the pull. Moreover, since the spacing between man holes is typically in the order of 800 ft., as the cable is pulled through the duct liner between adjacent man holes, it becomes difficult if not impossible to inject enough lubricant at the insert point for any lubricant to remain on the cable until the leading portion of the cable reaches or approaches the next man hole.

Improvements in the means and methods for pulling electrical wires or cables through duct liner are disclosed in U.S. Pat. No. 3,565,213 entitled LUBRICATING MEANS AND METHOD FOR ELECTRICAL WIRING CONDUITS. This patent discloses coupling devices which permanently couple together the ends of a pair of duct liners, and which are provided with three grease fittings for supplying lubricant under pressure to the duct liner at selected openings which may be as little as ten feet or less apart. The coupling device comprises a sleeve member which is internally threaded and adapted to receive threaded ends of pipe sections of the duct liner. Internal shoulders of the coupling device prevent the entrance of the pipe sections too far into the coupling device to prevent obstruction of the threaded grease fitting opening by any part of the duct liner. After lubrication through the fittings is completed, the grease fittings may be removed and the openings are normally plugged by a removable plug. Although this coupling device facilitates lubrication of cable or wiring contained within a duct liner, during wiring pulls, the coupling device is a permanent part of the duct liner system.

SUMMARY OF THE INVENTION

It is an object of the invention to provide an improved duct liner interconnect device for temporarily interconnecting the ends of a pair sections of flexible duct liner and provides for automatic introduction of lubricant into the duct liner to facilitate the pulling of cables through the duct liner.

Another object of the invention is to provide an improved duct liner interconnect device which is simple in construction and easy to install to interconnect the ends of two sections of flexible duct liners and hold them together in a spaced apart relation defining a space into which lubricant can be introduced for lubricating the cables while they are pulled through the duct liner, and which is easily removed from the duct liner after the cable pulling operation is completed.

The present invention provides a duct liner interconnect device for temporarily interconnecting axially aligned ends of two duct liner sections in a spaced apart relation while cables are being pulled into and through the duct liner, said duct liner interconnect device comprising a first semi-cylindrical element, a second semi-cylindrical element, hinge means and latching means, said first and second semi-cylindrical elements being complimentary in shape and each having a convex curved outer surface and a concave inner surface, said hinge means interconnecting said first and second elements along adjacent side edges thereof, said first and second elements being foldable about said hinge means from an open position in which said first and second elements are disposed side by side toward a closed position in which said first and second elements form a short tubular member with said concave inner surfaces defining a longitudinal channel to receive the ends of the duct liner sections, said latching means each including a spring clip, having a fixed end, a free end, and an arcuate, generally semicircular portion interconnecting said fixed and free ends, said fixed end being pivotally attached to said outer surface of said first element enabling said spring clip to be pivoted to a latch position, flexing its arcuate portion to cause its free end to be maintained in frictional engagement with said curved outer surface of said second element at a location substantially diametrically opposed to the location of said fixed end, maintaining said spring clip in its latch position, releasably latching said first and second elements together in this closed position, and said first and second elements each having a circumferentially extending shoulder portion on its inner surface which defines first and second stop surfaces for limiting insertion of the ends of the duct liner sections to maintain them in a spaced relationship defining a space therebetween, and one of said elements having at least one tapped aperture extending through said one element from its outer surface to its inner surface and said shoulder portion thereof for communicating the space with the exterior and being adapted to receive a lubrication fitting to permit the introduction of lubricant into the space between the ends of the duct liner sections for lubricating the cables, as they are pulled through the duct liner.

In accordance with a feature of the invention, when the spring clip is in its latch position, it produces a spring force which is applied to the second element in a direction from the free end to the fixed end of the spring clip, so that the force is directed substantially normal to a plane extending through engaging edge surfaces of the first and second elements.

In accordance with another feature of the invention, the spring clip is formed from a rod which is bent in half to provide a radial ends portion with first and second rod portions extending in parallel therefrom. Each of the rod portions is bent to have a radius of curvature corresponding substantially to the shape of the outer surface of the second element, first and second ends of the rod extending in juxta position and being bent to extend parallel to the radial end portion defining pivot pins for the spring clip.

The invention consists of certain novel features and structural details hereinafter fully described, illustrated in the accompanying drawings, and particularly pointed in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 1 is a front elevational view of the duct liner interconnect device shown interconnecting the ends of a pair of duct liners;

FIG. 2 is a rear elevational view of the duct liner interconnect device;

FIG. 3 is a plan view of the duct liner interconnect device, illustrated in the open position;

FIG. 4 is a plan view, similar to FIG. 3, but illustrating the manner in which the ends of a pair of ductliner section are received in the duct liner interconnect device;

FIG. 5 is a view in vertical section taken along the line 5—5 of FIG. 1;

FIG. 6 is an end view of the duct liner interconnect device, illustrated in a partially open position and with a duct liner section positioned therein; and FIG. 7 is a view illustrating further detail of the spring clip mount.

DESCRIPTION OF THE PREFERRED EMBODIMENT

Referring to FIGS. 1-3, the duct liner interconnect device 18 embodying the principles of the invention is shown interconnecting the ends of a pair of duct liner sections 19 and 20. The duct liner interconnect device 18 includes a first semi-cylindrical element 21, a second semi-cylindrical element 22, a hinge assembly 23 and a pair of latch assemblies 24 and 25.

The first element 21 of the duct liner interconnect device 18 has a convex outer surface 26 and a concave inner surface 27 which terminate at opposite longitudinal edges of the first element 21 in coplanar surfaces 28 and 28a. A pair of tapped apertures 29 and 30 are provided through the first element 21. The apertures 29 and 30 are circumferentially spaced near the center of the first element 21 and extend from its outer surface 26 to its inner surface 27. The concave inner surface 27 of the first element 21 has a shoulder 31 which defines a pair of stop surfaces 32 and 33 which are spaced apart from one another near the center of the first element 21 and extend circumferentially between edge surfaces 28 and 28a of the first element 21.

The second element 22 of the duct liner interconnect device 18 which is complementary to the first element 21, has a convex outer surface 36 and a concave inner surface 37 which terminate at opposite longitudinal edges of the second element 22 in coplanar surfaces 38 and 38a. The concave inner surface 37 has a shoulder 39 which defines a pair of stop surfaces 40 and 41 which are spaced apart from one another near the center of the second element 22 and extend circumferentially between edge surfaces 38 and 38a of the second element 22.

The first and second elements 21 and 22 may be made from a section of aluminum pipe, ten inches in length, which is counterbored to a depth of four inches at each end to define the shoulders 31 and 39 each two inches long. The machined pipe section is then cut in half to provide the two elements 21 and 22. Apertures 29 and 30 may be drilled and tapped prior to or after the pipe section is cut in half.

The hinge assembly 23 includes first and second hinge sections 43 and 44 (FIG. 2) and a hinge pin 45 (FIG. 5). Referring to FIGS. 2 and 3, the first and second elements 21 and 22 are interconnected along one longitudinal edge by the hinge assembly 23 which has hinge section 43 attached to the convex surface 26 of element 21 adjacent to its edge 28 and hinge section 44 attached to the convex surface 36 of element 22 adjacent to its edge 38. The hinge sections 43 and 44 are secured to respective elements 21 and 22 in a suitable manner such as by spot welding.

The first and second elements 21 and 22 are foldable about the hinge 23 from an open position, illustrated in FIG. 3, in which the first and second elements 21 and 22 are disposed in a side by side relation toward a closed position, illustrated in FIGS. 2 and 5, in which edge surface 28 of the first element 21 engages edge surface 38 of the second element 22 and edge surface 28a of element 21 engages edge surface 38a of the second element 22. In the closed position, the concave inner surfaces 27 and 37 define a longitudinal channel to recieve the ends of the duct liner sections 19 and 20 to be interconnected. The inner diameter of the tubular member formed by the first and second elements 21 and 22 when in their closed position is selected to correspond to the outer diameter of the duct liner sections 19 and 20 being interconnected and may vary from one wiring system to another.

The shoulders 31 and 39 maintain the ends of the duct liner sections 19 and 20 spaced apart. The apertures 29 and 30 in the first element 21 are provided through the center portion of shoulder 31. Thus, a lubrication fitting (not shown) inserted into either one of the threaded apertures 29 and 30 will have its outlet located in the space 42 between the ends of the two duct liner sections, allowing portions of the cables exposed therebetween, within the interconnect device 18, to be lubricated.

Referring to FIGS. 1 and 6, each of the latch assemblies 24 and 25 includes a U-shaped mounting member 46 and a spring clip 47. The mounting member 46 has a base 48 and a pair of upwardly extending ears 49 having apertures 50. The spring clip 48 has a fixed end 51, a free end 52 and an arcuate portion 53 between the fixed end 51 and the free end 52. The arcuate portion 53 includes a pair of semicircular legs 54 and 55 joined by a radial section 56 at one end, and defining mounting portions 59 and 60 at the other end.

Referring now to FIGS. 5-7, the mounting member 46 of each latch assembly has its base 48 attached in a suitable manner to the convex outer surface of the first element 21. In the exemplary embodiment, the base 48 of each mounting member 46 is welded at each end to the first element 21.

Each of the spring clips 47 is formed from a long rigid metal rod bent in half to provide radial sections 56 from which the semicircular legs 54 and 55 extend in a parallel side by side relation, spaced apart from one another by the length of the radial section 56. The ends 59 and 60 of the rod are bent outwardly from one another defining pivot pins for the spring clip 47. The ends 59 and 60 of the spring clip are received in apertures 50 in the mounting ears 49.

The radius of curvature of the arcuate portion 53 defined by legs 54 and 55 corresponds to that of the outer surface 36 of the second element 22 so that when the spring clip 47 is pivoted to its latch position, the undersides of the legs 54 and 55 engage the convex outer surface 36 of the element 22 and are held in place by friction. The spring tension draws the second element 22 towards the first element 21, compressing the ends of the duct liner sections 19 and 20 therebetween establishing a friction engagement which virtually prevents movement of the duct liner sections 19 and 20.

The duct liner interconnecting device 18 is intended for application for temporarily interconnecting the ends of a pair of duct liner sections during installation or removal of cable from the duct liner installation. The cable may be lightguide cable or any other type of electrical cable or wiring. In an existing installation, one or more duct liner interconnecting devices 18 temporarily replace the permanent coupler devices at each location where lubricant is to be injected into the duct liner. Typically, each coupler device is a sleeve type member which is positioned over the ends of adjacent sections of duct liner to couple together the two sections of duct liner as well as to enclose the discontinuity between the two duct liner sections, at which point the cable container within the duct liner is exposed.

In use of the duct liner interconnecting device 18, the existing sleeve or coupler device (not shown) is moved aside or otherwise removed to expose the junction between duct liner sections. With the duct liner interconnecting device 18 in its open position, one of the elements, for example the element 22, is positioned beneath the ends of the duct liner sections 19 and 20 and then raised upwardly to locate the ends of the duct liner sections 19 and 20 in the channel formed by the concave inner surface 37 of the element 22 and with their ends engaging the stop surfaces 41 and 40 as shown in FIG. 4.

Then, the other element 21 is pivoted about the hinge 23 until its edge 28 engages 38 of element 22, and edge 28a overlies edge 38a. The two spring clips 47 are then pivoted about fixed end 51 to a position where the free ends 52 engage the outer surface 36 of the element. With a little pressure applied to the legs 54 and 55, the free end 52 rides on the surface 36 of element 22, flexing the leg portions 54, 55. With continued pivoting of the spring clip 47, the arcuate leg portions 54, 55 of each spring clip 47 come to rest in frictional engagement with the surface of the element 22 at a location diametrically opposed to the location of the fixed end 51.

The force of the spring clip 47 drives the edge 38a of element 22 into engagement with edge 28a of the element 21, and drawing the opposing inner surfaces of the elements 21 and 22 into engagement with the outer surfaces of the two duct liner sections 19 and 20. As shown in FIG. 5, the fixed end 51 of the spring clip 47 is located approximately midway between the edges of element 21. When the spring clip is at its latch position, the free end 52 engages the surface 36 at a location which is diametrically opposed to the location of the fixed end 51. Thus the spring force is applied to element 22 substantially normal to a plane extending through the engaging edges of the two elements 21 and 22.

When the duct liner interconnecting device 18 is clamped onto the duct liner sections 19 and 20, a source of lubricant is connected to the fitting. As has been indicated, a lubricant fitting is provided in only one of the apertures, the other aperture providing an exhaust outlet for air in the space between the ends of the two duct liner sections as lubricant is injected into the space through the lubricant fitting in the other aperture. The lubricant is supplied automatically to the interior of the duct liner interconnecting device 18 during the cable pulling operation, to lubricate the cable as it passed through the lubricant injected into the space between the ends of the duct liner sections 19 and 20.

When the cable pulling operation has been completed, the source of lubricant is disconnected from the lubricant fitting and the duct liner interconnecting device 18 is removed by simply lifting the two latch springs 48, and pivoting the top element 21 about the hinge 23 to open the duct liner interconnecting device 18. The permanent coupler can then be put back in place. The duct liner interconnecting device 18 may then be used to temporarily interconnect duct liner sections at a different location.

I claim:

1. A duct liner interconnect device for temporarily interconnecting axially aligned ends of two duct liner sections in a spaced apart relation while cables are being pulled into and through the duct liner, said duct liner interconnect device comprising a first semi-cylindrical element, a second semi-cylindrical element, hinge means, and latching means, said first and second elements being complementary in shape and each having a convex curved outer surface and a concave inner surface, said hinge means interconnecting said first and second elements along adjacent side edges thereof, said first and second elements being foldable about said hinge means from an open position in which said first and second elements are disposed side by side toward a closed position in which said first and second elements form a short tubular member with said concave inner surfaces defining a longitudinal channel to receive the ends of the duct liner sections, said latching means including first and second latch assemblies, each including a spring clip having a fixed end, a free end, and an arcuate, generally semicircular portion interconnecting said fixed and free ends, said fixed end being pivotally attached to said outer surface of said first element enabling said spring clip to be pivoted to a latch position, flexing its arcuate portion to cause its free end to be maintained in frictional engagement with said curved outer surface of said second element at a location substantially diametrically opposed to the location of said fixed end, maintaining said spring clip in its latch position for releasably latching said first and second elements together in their closed position, said first and second elements each having a circumferentially extending shoulder portion on its inner surface which defines first and second stop surfaces for limiting insertion of the ends of the duct liner sections to maintain them in a spaced relationship defining a space therebetween, and one of said elements having at least one tapped aperture through said one element extending from its outer surface to its inner surface and said shoulder portion thereof for communicating the space with the exterior and being adapted to receive a lubrication fitting to permit the introduction of lubricant into the space between the ends of the duct liner sections for lubricating the cables as they are pulled through the duct liner.

2. A duct liner interconnect device according to claim 1 wherein said one element has a further aperture circumferentially spaced from said first mentioned aperture extending through said one element from its outer surface is its inner surface and said shoulder portion thereof, communicating the space with the exterior to provide an air outlet for exhausting air from the space as lubricant is introduced into the space through said first aperture.

3. A duct liner interconnect device according to claim 2 wherein said apertures are provided in said first element and located between said first and second latch assemblies.

4. A duct liner interconnect device according to claim 1 wherein said first and second elements are made of aluminum.

5. A duct liner interconnect device according to claim 1, wherein each of said spring clips comprises a metal rod having first and second ends, said rod being bent in half to provide a radial end portion with first and second rod portions extending in parallel therefrom and with said first and second ends of said rod extending in juxtaposition, each of said rod portions being bent to have a radius of curvature corresponding substantially to the shape of said outer surface of said second element, and said first and second ends of said rod being bent to extend parallel to said radial portion, defining pivot pins for said spring clip.

6. A duct liner interconnect device according to claim 5, wherein each of said latch assemblies further comprises a U-shaped mounting member having a base portion and first and second ears, said base portion being attached to said outer surface of said first element said first and second ears extending in a parallel spaced relation normal to said base portion and being apertured to receive said first and second ends of said rod.

7. A duct liner interconnect device for temporarily interconnecting axially aligned ends of two duct liner sections in a spaced apart relation while cables are being pulled into and through the duct liner, said duct liner interconnect device comprising a first semi-cylindrical element, a second semi-cylindrical element, hinge means, and latching means, said first and second elements being complementary in shape and each having a convex outer surface and a concave inner surface, said hinge means interconnecting said first and second elements along first longitudinal edges thereof, said first and second elements being foldable about said hinge means from an open position in which said first and second elements are disposed side by side toward a closed position in which said first and second elements form a short tubular member with said concave inner surfaces defining a longitudinal channel to receive the ends of the duct liner sections, said latching means including first and second latch assemblies each including a spring clip and a mounting member, each spring clip having a fixed end, a free end, and an arcuate generally semicircular portion interconnecting said fixed and free ends, said semicircular portion including first and second parallel extending rod members joined together at one end, defining said free end of said spring clip, and having respective first and second rod ends bent over to define first and second pivot pins at said fixed end of said spring clip, each mounting member being U-shaped having a base portion and first and second apertured ear portions, said base portion being attached to said outer surface of said first element with said apertured ear portions projecting outwardly therefrom with said first and second pivot pins being received thereby, defining a pivot axis for said spring clip, enabling said spring clip to be pivoted to a latch position, in which the arcuate portion of said spring clip is flexed causing its free end to be maintained in frictional engagement with said curved outer surface of said second element at a location substantially diametrically opposed to the pivot axis thereby maintaining said spring clip in its latch position releasably latching said first and second elements together in their closed position, said first and second elements each having a circumferentially extending shoulder portion on its concave inner surface which defines first and second stop surfaces which are engaged by the ends of the duct liner sections to maintain them in a spaced relationship defining a space therebetween, and said first element having first and second tapped apertures extending through said first element from its outer surface to its inner surface and said shoulder portion thereof communicating the space with the exterior, said first aperture being adapted to receive a lubrication fitting to permit the introduction of lubricant into the space between the ends of the duct liner sections for lubricating the cables as they are pulled through the duct liner, and said second aperture providing an air outlet for exhausting air from the space as lubricant is introduced into the space through said first aperture.

8. A duct liner interconnect device for temporarily interconnecting axially aligned ends of two duct liner sections in a spaced apart relation while cables are being pulled into and through the duct liner, said duct liner interconnect device comprising a first semi-cylindrical element, a second semi-cylindrical element, hinge means, and latching means, said first and second elements being complimentary in shape and each having a curved convex outer surface and a concave inner surface which terminate in first and second coplanar edge surfaces at opposite longitudinal edges thereof, said hinge means interconnecting said first and second elements along first longitudinal edges thereof, said first and second elements being foldable about said hinge means from an open position in which said first and second elements are disposed side by side toward a closed position in which said first and second elements form a short tubular member with said first edge surface of said first element engaging said first edge surface of said second element and said second edge surface of said first element overlying said second edge surface of said second element and said concave inner surfaces defining a longitudinal channel to receive the ends of the duct liner sections, said latching means including first and second latch assemblies, each including a spring clip having a fixed end, a free end, and an arcuate portion intermediate said fixed and free ends, said fixed end being pivotally attached to said outer surface of said first element at a location intermediate its longitudinal edges, enabling said spring clip to be pivoted to a latch position, said free end engaging said curved outer surface of said second element as said spring clip is pivoted towards its latch position and being directed away from said fixed end whereby said spring clip is flexed, producing a spring force which is applied to said second element in a direction from said free and towards said fixed end, urging its second edge surface into engagement with said second edge surface of said first element, and when said spring clip reaches its latch position, said free end engages said curved outer surface of said second element at a location substantially diametrically opposed to the location of the fixed end, whereby the spring force is directed substantially normal to a plane extending through the engaging first and second edge surfaces of said first and second elements, and said spring clip is maintained in its latch position by frictional forces for releasably latching said first and second elements together in their closed position, said first and second elements each having a circumferentially extending shoulder portion on its inner surface which define first and second stop surfaces which are engaged by the ends of the duct liner sections to maintain them in a spaced relationship defining a space therebetween, and one of said elements having at least one tapped aperture through said one element extending from its outer surface to its inner surface and said shoulder portion thereof for communicating the space with the exterior and being adapted to receive a lubrication fitting to permit the introduction of lubricant into the space between the ends of the duct liner sections for lubricating the cables as they are pulled through the duct liner.

9. A duct liner interconnect device according to claim 8, wherein each of said spring clips comprises a metal rod having first and second ends, said rod being bent in half to provide a radial portion with first and second rod portions extending in parallel therefrom and with said first and second ends of said rod extending in juxtaposition, each of said rod portions being bent to have a radius of curvature corresponding substantially to the shape of said outer surface of said second element, and said first and second ends of said rod being bent to extend parallel to said radial portion, defining pivots for said spring clip.

* * * * *